(12) United States Patent
Cho et al.

(10) Patent No.: US 8,414,365 B2
(45) Date of Patent: Apr. 9, 2013

(54) AIR INTAKE METHOD AND SYSTEM OF AIR CONDITIONER FOR VEHICLE

(75) Inventors: Hoo Taek Cho, Gyunggi-Do (KR); Yong Chul Kim, Gyunggi-Do (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 924 days.

(21) Appl. No.: 12/510,657

(22) Filed: Jul. 28, 2009

(65) Prior Publication Data

US 2010/0144260 A1 Jun. 10, 2010

(30) Foreign Application Priority Data

Dec. 5, 2008 (KR) .................. 10-2008-0123125

(51) Int. Cl.
*B60H 1/00* (2006.01)
(52) U.S. Cl. .......................................... 454/75; 165/202
(58) Field of Classification Search .................. 454/75; 165/202
See application file for complete search history.

(56) References Cited

U.S. PATENT DOCUMENTS

| 6,454,180 B2* | 9/2002 | Matsunaga et al. ...... 237/12.3 B |
| 7,272,944 B2* | 9/2007 | Ichishi et al. .................... 62/126 |
| 7,958,740 B2* | 6/2011 | Hirai et al. ...................... 62/150 |
| 8,092,285 B2* | 1/2012 | Mathur et al. .................. 454/75 |
| 2004/0168450 A1* | 9/2004 | Nishiwaki ...................... 62/178 |

* cited by examiner

*Primary Examiner* — Steven B McAllister
*Assistant Examiner* — Helena Kosanovic
(74) *Attorney, Agent, or Firm* — Morgan, Lewis & Bockius LLP

(57) ABSTRACT

An air intake method and system of an air conditioner for a vehicle may include a temperature measuring step, a speed sensing step, a blower sensing step, and a simultaneous indoor and outdoor air intake step. The air intake system includes a water temperature sensor for measuring the temperature of cooling water of the vehicle, a speed sensor for measuring the speed of the vehicle, a control switch for turning on or off a blower, a control unit and an intake actuator. The control unit receives the temperature measured by the water temperature sensor, the speed measured by the speed sensor and ON/OFF data from the control switch, thus determining whether to simultaneously draw indoor and outdoor air in or not. The intake actuator provides driving force so that an indoor and outdoor air control door simultaneously opens indoor and outdoor air inlets.

7 Claims, 3 Drawing Sheets

AIR INTAKE METHOD AND SYSTEM OF AIR CONDITIONER FOR VEHICLE

CROSS-REFERENCE TO RELATED APPLICATION

The present application claims priority to Korean Patent Application Number 10-2008-0123125 filed Dec. 5, 2008, the entire contents of which application is incorporated herein for all purpose by this reference.

BACKGROUND OF THE INVENTION

1. Field of the Invention

The present invention relates generally to an air intake method and system of an air conditioner for a vehicle and, more particularly, to an air intake method and system of an air conditioner for a vehicle, which is capable of simultaneously sucking in indoor and outdoor air using a control unit determining whether to draw in indoor air or not according to the temperature of cooling water and the speed of the vehicle, without the need for an additional flap for the intake of indoor air, thus reducing the manufacturing cost.

2. Description of Related Art

As shown in FIG. 1, an air conditioner for vehicles is generally installed in a vehicle. Such an air conditioner appropriately controls the indoor temperature of the vehicle, thus providing a pleasant environment for occupants. A driver heats the interior of the vehicle using the air conditioner in winter. When the interior of the vehicle is heated using the air conditioner for vehicles, the driver can select an indoor air mode or an outdoor air mode. When the indoor air mode is selected, the indoor air of the vehicle is drawn into the air conditioner, and the temperature of the drawn air is increased, prior to being supplied to the interior of the vehicle again. Further, outdoor air may be drawn into the air conditioner and the temperature of the outdoor air may be increased, prior to being supplied to the interior of the vehicle. In order to rapidly increase the indoor temperature in winter, the indoor air mode using indoor air which is higher in temperature than outdoor air is usually conducted. This is advantageous from the point of view of heating, but is problematic in that, as only indoor air circulates, the indoor temperature of the vehicle rapidly increases, so that an excessive amount of moisture is generated on windows due to the abrupt temperature difference between the indoor and outdoor air, thus inconveniencing a driver. Thus, even when the interior of the vehicle is heated in winter, the outdoor air mode is recommended. However, the outdoor air mode is problematic in that energy efficiency is low in terms of heating performance because of the wasted heat of an engine.

Thus, the method of simultaneously drawing in indoor and outdoor air and mixing the drawn air has been proposed.

Conventionally, in order to simultaneously draw in indoor and outdoor air and mix the drawn air, an additional flap F is installed to an indoor and outdoor air control door D which selectively closes an indoor air inlet or an outdoor air inlet. The flap F is opened by the pressure of a blower B during the intake of outdoor air, so that indoor and outdoor air is simultaneously drawn into the air conditioner. However, the conventional air intake method is problematic in that the manufacturing cost is increased due to the installation of the additional flap F. In the case where the operation of the blower B is weak, the intake amount of the indoor air is reduced. Even in the case where the indoor and outdoor air are simultaneously drawn in, if a vehicle runs at high speed, the cold outdoor air flows to the blower B, and in addition, may flow into a direction in which the indoor air is drawn. Thus, the initial heating performance of the vehicle has a low efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an air intake method and system of an air conditioner for a vehicle, which is capable of simultaneously drawing in indoor and outdoor air and controlling the mixing ratio of the indoor and outdoor air without an additional flap, using a control unit that senses the temperature of cooling water and the speed of the vehicle, determines whether to draw in the indoor air or not and determines the intake amount of the indoor air using sensed data.

In some aspects of the present invention, the air intake method of an air conditioner for a vehicle, may include the steps of a) measuring a temperature of cooling water of the vehicle, b) measuring a speed of the vehicle when the temperature of the cooling water is lower than a reference temperature, c) determining whether a blower is ON or OFF when the speed of the vehicle is lower than a reference speed, and d) simultaneously drawing in indoor and outdoor air to improve initial heating performance of the vehicle when the blower is determined to be ON.

The steps a)-d) may be repeated.

A previously set indoor and outdoor air-converting mode may be conducted when the temperature of the cooling water is higher than the reference temperature.

A previously set indoor and outdoor air-converting mode may be conducted when the speed of the vehicle is higher than the reference speed.

A previously set indoor and outdoor air-converting mode may be conducted when the blower is determined to be OFF.

In other aspects of the present invention, before the measurement of the temperature of the cooling water of the vehicle, an intake amount of the indoor air may be preset according to the reference temperature of the cooling water and the reference speed of the vehicle.

After the determination of whether the blower is ON or OFF, a measurement of indoor temperature may be conducted to control an intake amount of indoor air according to the indoor temperature of the vehicle.

In further aspects of the present invention, the air intake system of an air conditioner for a vehicle, may include a water temperature sensor for measuring a temperature of cooling water of the vehicle, a speed sensor for measuring a speed of the vehicle, a control switch for turning on or off a blower, a control unit receiving the temperature measured by the water temperature sensor, the speed measured by the speed sensor and ON/OFF data from the control switch, thus determining whether to simultaneously draw indoor and outdoor air in or not, and an intake actuator for providing driving force to the indoor and outdoor air control door so that the indoor and outdoor air control door opens indoor and outdoor air inlets simultaneously when the control unit determines simultaneous intake of the indoor and outdoor air.

The control unit may control an opening angle of the indoor and outdoor control door depending on an initial indoor temperature of the vehicle when the simultaneous intake of the indoor and outdoor air is determined, thus controlling an intake ratio of the indoor and outdoor air.

The indoor and outdoor air control door may be disposed at a bifurcated portion of indoor, outdoor, and blower air inlets.

In order to accomplish the above object, the present invention provides an air intake method of an air conditioner for a vehicle, including the steps of measuring a temperature of cooling water of the vehicle, measuring a speed of the vehicle when the temperature of the cooling water is lower than a reference temperature, determining whether a blower is ON or OFF when the speed of the vehicle is lower than a reference speed, and simultaneously drawing in indoor and outdoor air to improve initial heating performance of the vehicle when the blower is determined to be ON.

A previously set indoor and outdoor air-converting mode may be conducted when the temperature of the cooling water is higher than the reference temperature.

Further, a previously set indoor and outdoor air-converting mode may be conducted when the speed of the vehicle is higher than the reference speed.

After the determination of whether the blower is ON or OFF, the measurement of indoor-temperature may be conducted to control an intake amount of indoor air according to indoor temperature of the vehicle.

In order to accomplish the above object, the present invention provides an air intake system of an air conditioner for a vehicle, including a water temperature sensor for measuring a temperature of cooling water of the vehicle, a speed sensor for measuring a speed of the vehicle, a control switch for turning on or off a blower, a control unit receiving the temperature measured by the water temperature sensor, the speed measured by the speed sensor and ON/OFF data from the control switch, thus determining whether to simultaneously draw indoor and outdoor air in or not, and an intake actuator for providing driving force so that an indoor and outdoor air control door simultaneously opens indoor and outdoor air inlets when the control unit determines simultaneous intake of the indoor and outdoor air.

Further, the control unit may control the opening angle of the indoor and outdoor control door depending on an initial indoor temperature of the vehicle when the simultaneous intake of the indoor and outdoor air is determined, thus controlling an intake ratio of the indoor and outdoor air.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an air intake system and method of an air conditioner for a vehicle according to various embodiments of the present invention will be described with reference to the accompanying drawings.

Figure 1:
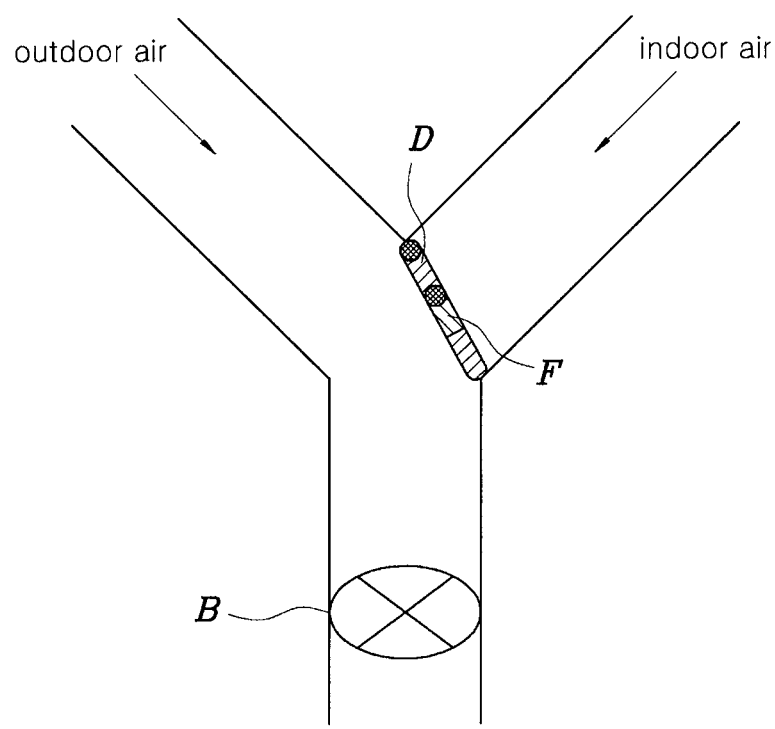
FIG. 1 is a view illustrating a conventional air intake device of an air conditioner for a vehicle.
Figure 2:
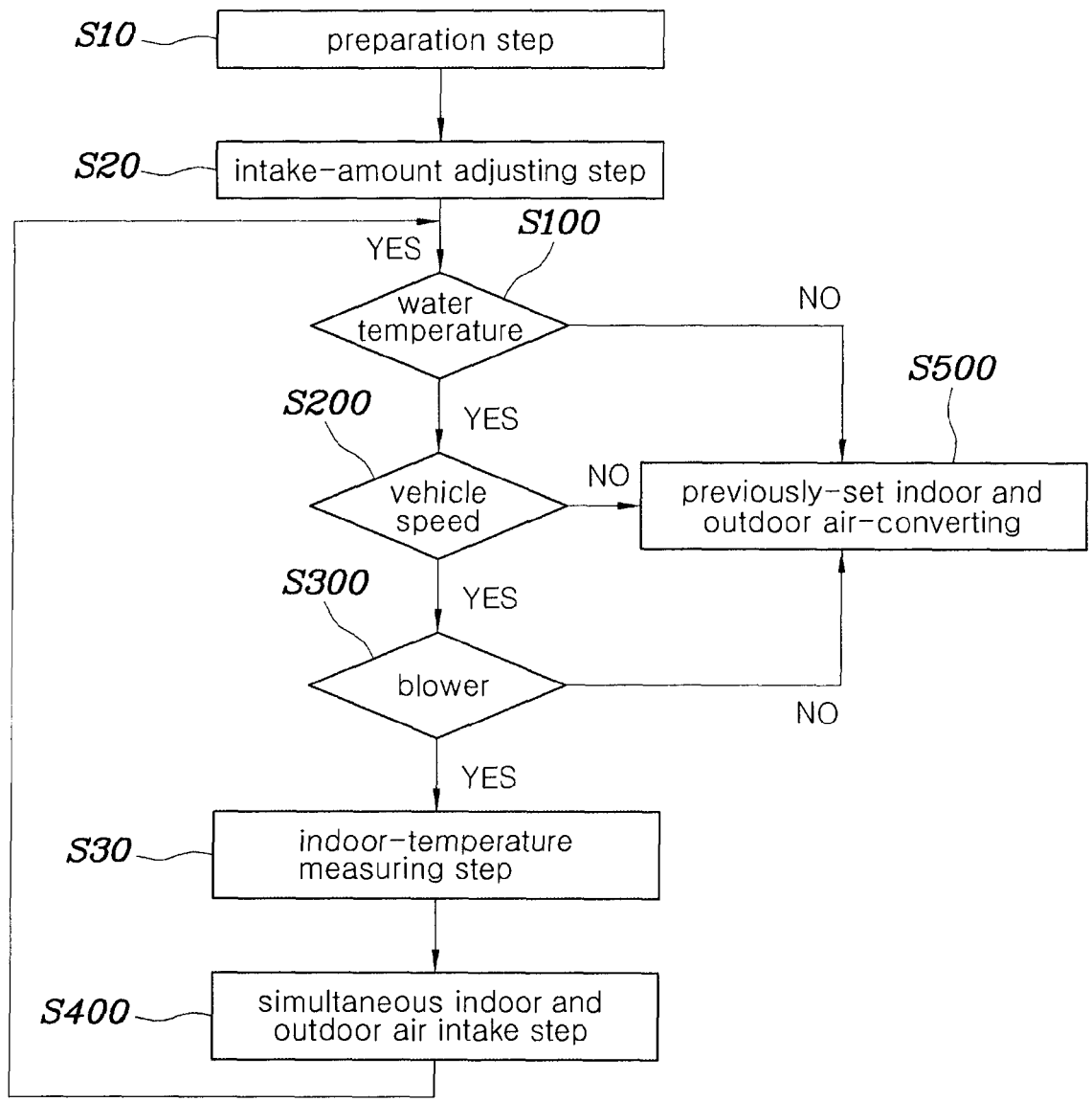
FIG. 2 is a flowchart illustrating an exemplary method of determining whether to draw in indoor air or not, according to the present invention.

As shown in FIG. 2, the air intake method and system of an air conditioner for a vehicle according to various embodiments of the present invention includes the preparation step S10 of setting the mixing mode of indoor and outdoor air. The occupant of the vehicle may set this in the air intake method according to the present invention. When the air intake method of the air conditioner for the vehicle according to various embodiments of the present invention is set at the preparation step S10, the temperature measuring step S100 of measuring the temperature of cooling water is performed. At the temperature measuring step S100, the temperature of the cooling water is measured, so that data is collected to determine whether the vehicle is presently in an initial driving state or not. The data is transmitted to a control unit C. The temperature of the cooling water rises in proportion to the operating time of an engine depending on the running time of the vehicle. As such, by measuring the temperature of the cooling water, it may be determined whether the present driving state of the vehicle is the initial driving state or not.

Thus, when the temperature T of the cooling water is lower than a reference temperature T1, it can be determined that the vehicle is in the initial driving state. The reference temperature T1 is about 70° C. or so. When the temperature T of the cooling water is lower than the reference temperature T1, this satisfies one condition for simultaneously drawing in indoor and outdoor air. However, when the temperature T of the cooling water is the reference temperature T1 or higher, it is determined that the driving state of the vehicle is not the initial driving state. Thus, the air intake method according to various embodiments of the present invention is terminated, and then an indoor and outdoor air-converting mode S500 is conducted, in which the indoor or outdoor air mode which was previously set by the occupant is conducted.

When it is determined that the vehicle is in the initial driving state through the temperature measuring step S100, the speed sensing step S200 of detecting the speed of the vehicle is conducted. At the vehicle speed sensing step S200, it is determined whether to draw in indoor air or not according to the driving speed S of the vehicle. When the occupant desires to heat the interior of the vehicle in winter, if the vehicle runs at a high driving speed S, outdoor air is drawn towards a blower by the blower, and simultaneously, is guided in an indoor-air intake direction, so that the outdoor air may be directly discharged to the interior of the vehicle. In this case, the speed of the outdoor air which does not flow towards the blower but flows directly into an indoor air inlet is faster than the speed of the outdoor air which flows to the blower along with the indoor air, passes through a heat exchanger and flows into the vehicle again, so that the occupant in the vehicle may feel cold outdoor air. This may deteriorate initial heating performance in the vehicle. Thus, at the speed sensing step S200, it is determined whether the driving speed S of the vehicle is the reference speed S1 or higher, thus determining whether to draw in the indoor air or not. The reference speed S1 is about 60 km/hr or so. When the driving speed S of the vehicle is lower than the reference speed S1, the speed of heating the interior of the vehicle is faster than the speed of the cold outdoor air which is directly discharged to the interior of the vehicle, and the amount of the outdoor air discharged to the interior of the vehicle is small. Thus, the inlet for introducing indoor air is open, so that the indoor air is drawn in.

If the speed S of the vehicle is higher than the reference speed S1, the speed of the outdoor air drawn in the direction of the indoor-air intake inlet is fast, so that the indoor-air intake inlet is closed so as to prevent the outdoor air from being discharged to the interior of the vehicle, and thus the intake of the indoor air is terminated. In this case, the air intake method according to various embodiments of the present invention is completed, and then the indoor and outdoor air-converting mode S500 which was previously set by the occupant is conducted. That is, when it is determined that the speed S of the vehicle is lower than the reference speed S1 through the speed sensing step S200, one condition for the drawing in of indoor air is satisfied.

At the temperature measuring step S100, the initial driving state of the vehicle is checked. When it is determined that the speed of the vehicle is the reference speed S1 or less at the speed sensing step S200, so that the speed of drawing in the indoor air and heating the interior of the vehicle is faster than the speed at which the outdoor air is directly discharged to the indoor air inlet, a blower sensing step S300 is conducted to detect the operating state of the blower.

At the blower sensing step S300, it is determined whether the blower is ON or OFF and whether the operating intensity of the blower is strong or weak. When it is detected that the blower is ON, the preparation for the intake of the indoor air as well as the outdoor air has been completed. However, when the blower is OFF, it is impossible to apply the air intake system and method according to the present invention. Hence, the air intake system and method according to various embodiments of the present invention is terminated, and the indoor and outdoor air-converting mode S500 which was previously set by the occupant is conducted.

When all the conditions of the temperature measuring step S100, the speed sensing step S200 and the blower sensing step S300 are satisfied, a simultaneous indoor and outdoor air intake step S400 is conducted to draw the indoor air as well as the outdoor air in towards the blower.

Meanwhile, the preparation step S10 which is performed before the temperature measuring step S100 preferably includes the intake-amount adjusting step S20 of adjusting the intake amount of the indoor air. That is, before it is determined whether to draw in the indoor air or not, the intake amount of the indoor air must be set within the range for the present vehicle state according to the reference temperature of the cooling water and the reference speed of the vehicle. While the intake amount of the indoor air is adjusted per a given environment, the optimum interior environment and energy efficiency during the heating operation can be realized. The process of adjusting the intake amount of the indoor air may be performed by adjusting the operating intensity of the blower, according to the temperature T of the cooling water and the speed S of the vehicle which are the given conditions. If the occupant desires to increase the intake amount of the indoor air, the operating intensity of the blower is set to be strong. In contrast, if the occupant desires to reduce the intake amount of the indoor air, the operating intensity of the blower is set to be weak.

Further, the intake-amount adjusting step S20 is conducted by adjusting the opening angle of a control door which is installed between paths for drawing in indoor and outdoor air in such a way as to be positioned between the indoor air inlet and the outdoor air inlet. Unlike the related art, it is not necessary to install an additional flap to a control door which completely opens or closes the indoor and outdoor inlets so as to simultaneously draw in the indoor and outdoor air, so that the manufacturing cost is reduced.

Meanwhile, after the conditions of the temperature measuring step S100, the speed sensing step S200, and the blower sensing step S300 are satisfied, an indoor-temperature measuring step S30 is conducted. In addition to previously determining the amount of indoor and outdoor air which is to be drawn in through the intake-amount adjusting step S20, the indoor temperature of the vehicle is measured at the indoor-temperature measuring step S30 to provide the most pleasant environment to the interior of the vehicle within the shortest period of time depending on the present indoor temperature of the vehicle which is being driven, thus determining the intake amount of the indoor and outdoor air.

In various embodiments of the present invention, the steps of S100, S200, S300, S30, and S400 may be repeated.

Through the above steps, indoor air can be drawn in. When the vehicle is heated in the initial driving stage, the indoor air which is higher in temperature than the outdoor air can be drawn in and used, so that energy efficiency is increased. The air intake method allows indoor air to be drawn in simultaneously with the outdoor air being drawn in. Further, without using the additional flap provided on the control door, the mixing ratio of the indoor and outdoor air is controlled by adjusting the intensity of the blower or the opening angle of the control door according to respective conditions, thus reducing the manufacturing cost.

As shown in the following table 1, when comparing the air intake method of the air conditioner for vehicles according to various embodiments of the present invention with the air intake method of mixing indoor and outdoor air using the additional flap, the air intake method of this invention can further increase the indoor temperature of the vehicle for the same speed and the same time period. Since the times in table 1 correspond to the times of the engine being operated, it is related to the temperature T of the cooling water.

TABLE 1

|  | Related art | Present invention |
| --- | --- | --- |
| 20 minutes (50 Kph) | 12.4° C. | 15.1° C. |
| 40 minutes (90 Kph) | 27° C. | 30.4° C. |
| 50 minutes (Idle) | 22.9° C. | 24.5° C. |
| Idle change rate | −4.1° C. | −5.9° C. |

Figure 3:
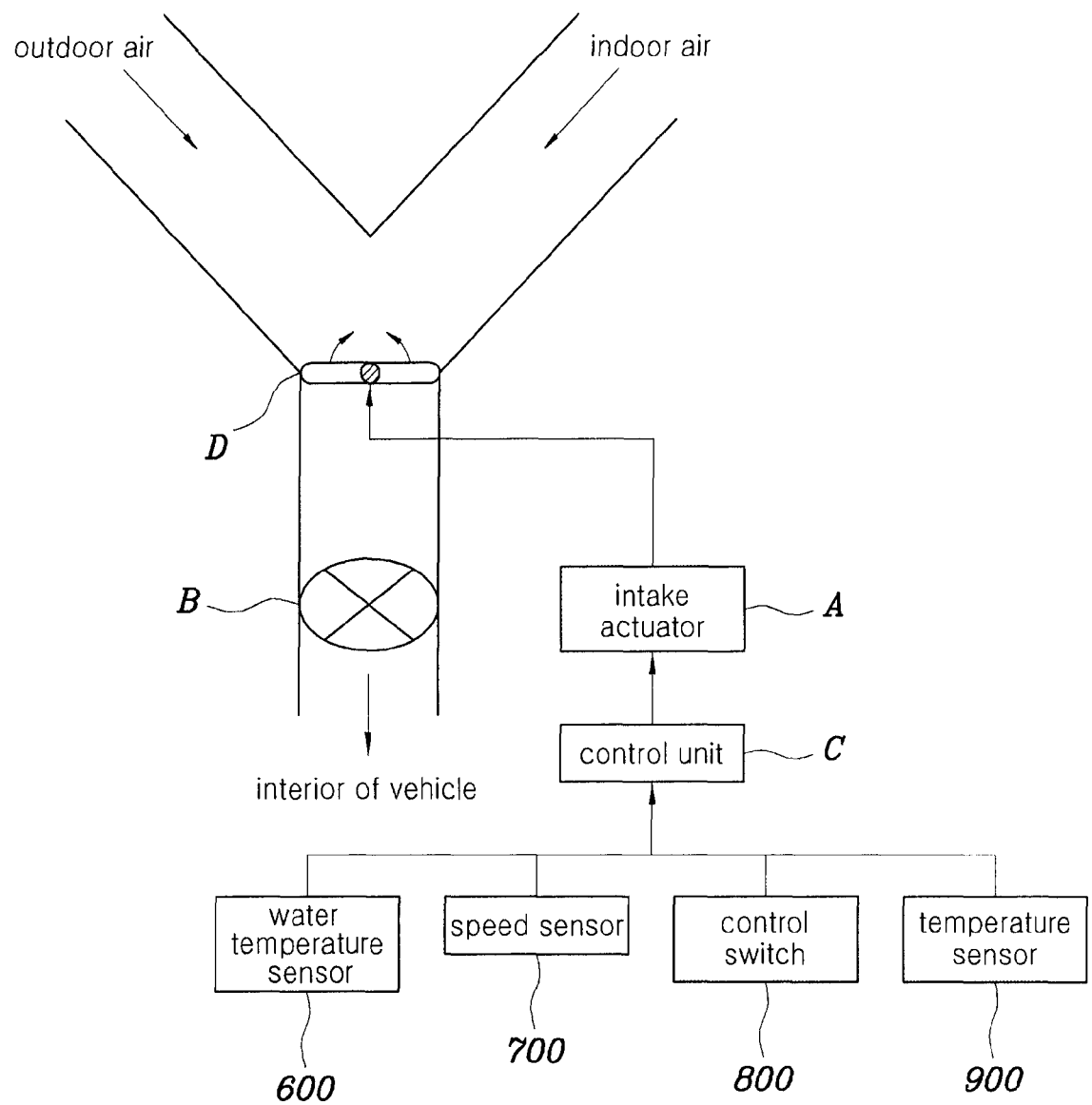
FIG. 3 is a view illustrating an exemplary air intake system of an air conditioner for a vehicle according to the present invention.

Hereinafter, the air intake system of the air conditioner for vehicles will be described with reference to FIG. 3. The air intake system of the air conditioner for vehicles according to various embodiments of the present invention includes a water temperature sensor 600 which measures the temperature of cooling water, and a speed sensor 700 which detects the speed of the vehicle. The data measured by the water temperature sensor 600 and the speed sensor 700 is read by the control unit C, so that it is determined whether to draw the indoor air in or not. As described above, the control unit C determines whether the temperature T of the cooling water is lower than the reference temperature T1 and the speed S of the vehicle is lower than the reference speed S1. Further, a control switch 800 determines whether the blower B is ON or OFF, and transmits the ON/OFF data to the control unit C. Further, the indoor temperature of the vehicle is measured by a temperature sensor 900, so that the measured temperature is transmitted to the control unit C. In response to the transmitted data, the control unit C effectively operates an intake actuator A, thus controlling the intake amount of the indoor air. In the case of satisfying the conditions, the control unit C determines the intake of the indoor air, adjusts the intensity of the blower B according to the collected data, or controls the intake actuator A, thus adjusting the opening angle of the indoor and outdoor air control door D, therefore adjusting the amount of the indoor air which is to be drawn in. Therefore, according to the intake amount of the indoor air, the mixing ratio of the indoor and outdoor air can be adjusted.

As described above, the present invention provides an air intake method and system which has the above-mentioned construction, so that it is not necessary to install an additional flap for simultaneously drawing in indoor and outdoor air, and thus the manufacturing cost is reduced. Moreover, cold outdoor air drawn while a vehicle is being driven at high speed is prevented from branching and flowing into the vehicle, thus improving the initial heating performance of the vehicle.

For convenience in explanation and accurate definition in the appended claims, the term "interior" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air intake method of an air conditioner for a vehicle, comprising the steps of:
   a) measuring a temperature of cooling water of the vehicle;
   b) measuring a speed of the vehicle when the temperature of the cooling water is lower than a reference temperature;
   c) determining whether a blower is ON or OFF when the speed of the vehicle is lower than a reference speed; and
   d) measuring an indoor temperature to control an intake amount of indoor air
   e) simultaneously drawing in indoor and outdoor air to improve initial heating performance of the vehicle when the blower is determined to be ON.

2. The air intake method as set forth in claim 1, repeating the steps a)-d).

3. The air intake method as set forth in claim 1, wherein a previously set indoor and outdoor air-converting mode is conducted when the temperature of the cooling water is higher than the reference temperature.

4. The air intake method as set forth in claim 1, wherein a previously set indoor and outdoor air-converting mode is conducted when the speed of the vehicle is higher than the reference speed.

5. The air intake method as set forth in claim 1, wherein a previously set indoor and outdoor air-converting mode is conducted when the blower is determined to be OFF.

6. The air intake method as set forth in claim 1, wherein, before the measurement of the temperature of the cooling water of the vehicle, an intake amount of the indoor air is preset according to the reference temperature of the cooling water and the reference speed of the vehicle.

7. The air intake method as set forth in claim 1, wherein, after the determination of whether the blower is ON or OFF, a measurement of indoor temperature is conducted to control an intake amount of indoor air according to the indoor temperature of the vehicle.

* * * * *